United States Patent
Holl et al.

(10) Patent No.: US 6,424,115 B1
(45) Date of Patent: Jul. 23, 2002

(54) CONTROL SYSTEM FOR A HYBRID SYSTEM CONSISTING OF AT LEAST ONE ENERGY ACCUMULATOR AND ONE ENERGY SOURCE

(76) Inventors: Eugen Holl, Langenzenn; Hans-Peter Lang, Neunkirchen; Jürgen Fetzer, Erlangen; Manfred Schmidt, Herzogenaurach, all of (DE)

( * ) Notice: Subject to any disclaimer, the term of this patent is extended or adjusted under 35 U.S.C. 154(b) by 0 days.

(21) Appl. No.: 09/719,629
(22) PCT Filed: Jun. 7, 1999
(86) PCT No.: PCT/DE99/01670
  § 371 Date: Dec. 15, 2000
  § 102(e) Date: Dec. 15, 2000
(87) PCT Pub. No.: WO99/65725
  PCT Pub. Date: Dec. 23, 1999

(30) Foreign Application Priority Data

Jun. 15, 1998 (DE) ............................................. 198 26 551

(51) Int. Cl.⁷ ..................................................... H01M 10/46
(52) U.S. Cl. ............................................................ 320/104
(58) Field of Search ................................... 320/103, 104, 320/127, 128, 134, 135, 137

(56) References Cited

U.S. PATENT DOCUMENTS 5,402,046  3/1995  Jeanneret .

FOREIGN PATENT DOCUMENTS

| 2952500A1 | 7/1981 | (DE) . |
| 2952500C2 | 7/1987 | (DE) . |
| 4000678A1 | 7/1991 | (DE) . |
| 4341817A1 | 6/1994 | (DE) . |
| 19505726A1 | 9/1995 | (DE) . |
| 4116899C2 | 11/1995 | (DE) . |
| 4133013C2 | 11/1995 | (DE) . |
| 19505431A1 | 8/1996 | (DE) . |
| 19617548A1 | 11/1997 | (DE) . |
| 19624252A1 | 1/1998 | (DE) . |
| 0543037A1 | 5/1993 | (EP) . |
| 0782941A1 | 7/1997 | (EP) . |
| 0830968A1 | 3/1998 | (EP) . |

OTHER PUBLICATIONS

Journal: Electric Vehicle Association of the Americas, "Driving the Worlds," Dec. 1997.

*Primary Examiner*—Edward H. Tso

(57) ABSTRACT

The present invention relates to a control system for a hybrid system comprising at least one energy store (1) and an energy source (2), the control system using a charge state (Z) in the at least one energy store (1), a nominal operating point (P11) of the energy source (2) and a system power (P1) which is currently to be output to ascertain a storage power (P3) which is to be output or received by the at least one energy store (1) and a source power (P2) which is to be output by the energy source (2) on the basis of at least one optimization criterion. In order to create a particularly flexible control system, the invention provides that at least one charge limit value (P4, P7, P8) and at least one discharge limit value (P5, P9, P10) for the at least one energy store (1) and a power limit value (P12) for the energy source (2) are also used at the same time in order to ascertain the storage power (P3) and the source power (P2), and that the at least one charge limit value (P4, P7, P8), the at least one discharge limit value (P5, P9, P10), the power limit value (P12) and the nominal operating point (P11) can be parameterized via an interface (5) in the control system.

16 Claims, 2 Drawing Sheets

Figure 1:
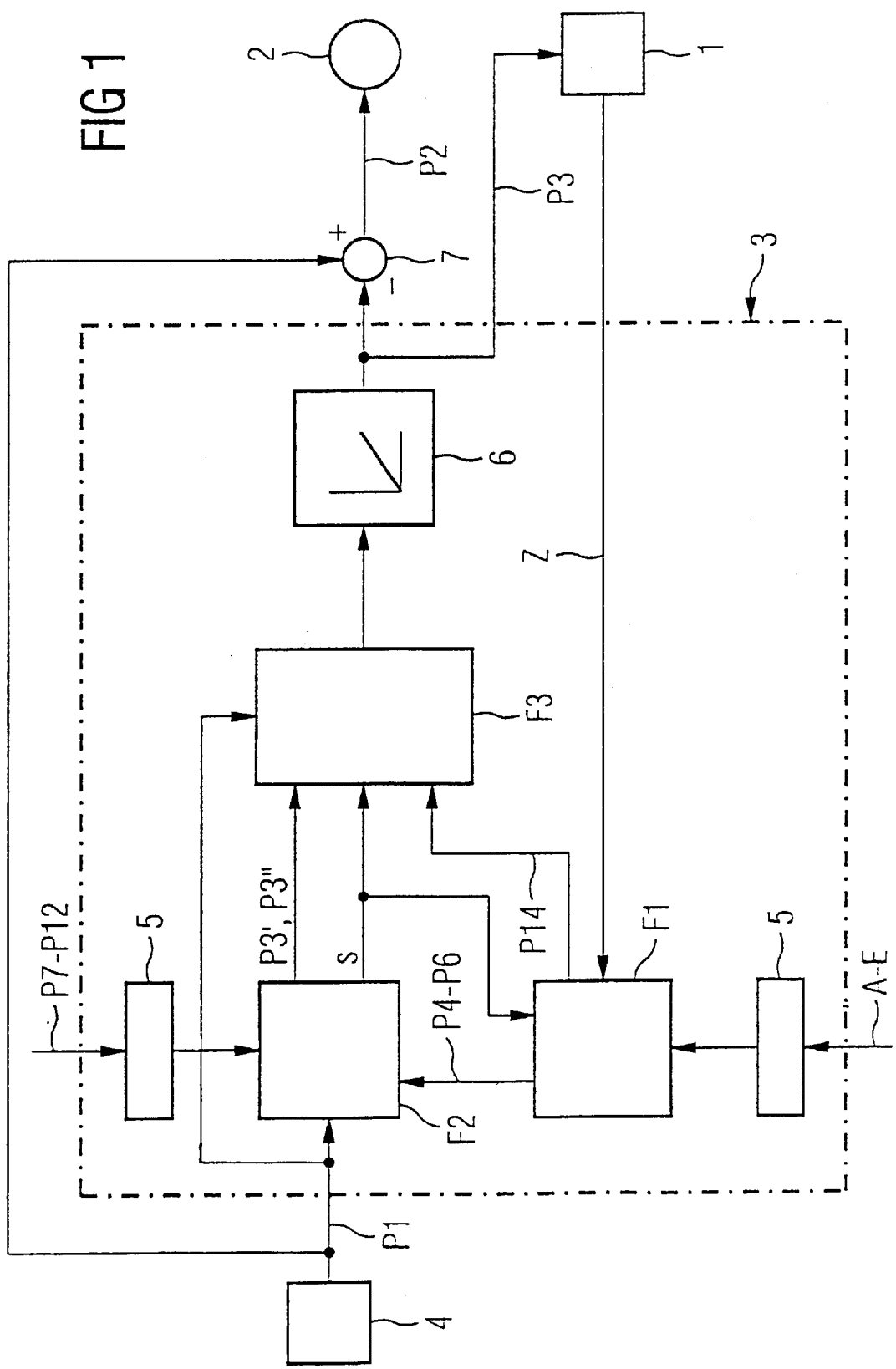

CONTROL SYSTEM FOR A HYBRID SYSTEM CONSISTING OF AT LEAST ONE ENERGY ACCUMULATOR AND ONE ENERGY SOURCE

The present invention relates to a control system for a hybrid system comprising at least one energy store and an energy source, the control system using a charge state in the at least one energy store, a nominal operating point of the energy source and a system power which is currently to be output to ascertain a storage power which is to be output or received by the at least one energy store and a source power which is to be output by the energy source on the basis of at least one optimization criterion.

Such a control system is known from DE 196 24 252 A1. DE 195 05 726 A1 and DE 43 41 817 A1 also disclose similar control systems for a hybrid system. Depending on the configuration and design of the energy store and the energy source, the power ratio between the two may fluctuate. In all cases, however, the energy source is an internal combustion engine having a coupled generator, and the energy store is a battery.

In the prior art, control systems for hybrid systems are always designed specifically for the respective hybrid system. Hence, a dedicated control system is formed for each hybrid system.

DE 29 52 500 C2 discloses a control unit which can be used to select one of a plurality of subsections of a store. In particular, the control unit can be used in an on-board computer for motor vehicles.

The object of the present invention is to create a control system which can be used universally for a multiplicity of hybrid systems. In particular, the aim is to create a control system which is not stipulated for a specific combination of a particular energy store with a particular energy source. By way of example, the aim is for the at least one energy store to be able to be a battery, a supercapacitor or a flywheel. The energy source is intended to be capable of being an internal combustion engine having a coupled generator, or a fuel cell or an overhead line, for example. The power ratio between the energy store and the energy source is also intended to be capable of fluctuating significantly, e.g. between 15:85 and 85:15.

The object is achieved by virtue of the fact that at least one charge limit value and at least one discharge limit value for the at least one energy store and a power limit value for the energy source are also used at the same time in order to ascertain the storage power and the source power, and that the at least one charge limit value, the at least one discharge limit value, the power limit value and the nominal operating point can be parameterized via an interface in the control system.

The control system is even more flexible if an energy store charge limit value provided on the basis of the at least one energy store and an input charge limit value which can be input are prescribed to the control system as charge limit values.

The control system is also more flexible if an energy store discharge limit value provided on the basis of the at least one energy store and an input discharge limit value which can be input are prescribed to the control system as discharge limit values.

The flexibility of the control system is increased still further if the at least one optimization criterion can be prescribed via the interface in the control system.

The control response of the control system is optimized still further if the control system uses the charge state of the at least one energy store to ascertain a state charge limit value, a state discharge limit value and a source charge power on the basis of power characteristic values for the at least one energy store, the power characteristic values comprise at least one minimum energy content and a maximum energy content and the power characteristic values can also be prescribed via the interface in the control system.

The energy store is optimally utilized if the control system uses the charge state of the at least one energy store to ascertain a critical system power to be output at which the energy store is changed over from energy absorption to energy output and vice versa.

If the critical system power is subject to hysteresis, constant changeover between charging and discharging is prevented.

If the control system uses the power limit value and the nominal operating point to ascertain whether there is a changeover from energy absorption to energy output when the critical system power is exceeded or undershot, the user of the control system does not need to parameterize the latter.

The charge state of the at least one energy store is optimized still further if the critical system power is corrected if the charge state of the energy store falls below the minimum energy content or exceeds the maximum energy content.

Excessive changes in the source power are prevented if the storage power is supplied to an adder via a ramp as first input signal, the second input signal supplied to said adder being the system power which is to be output, and the output signal which is output is the source power.

Figure 2:
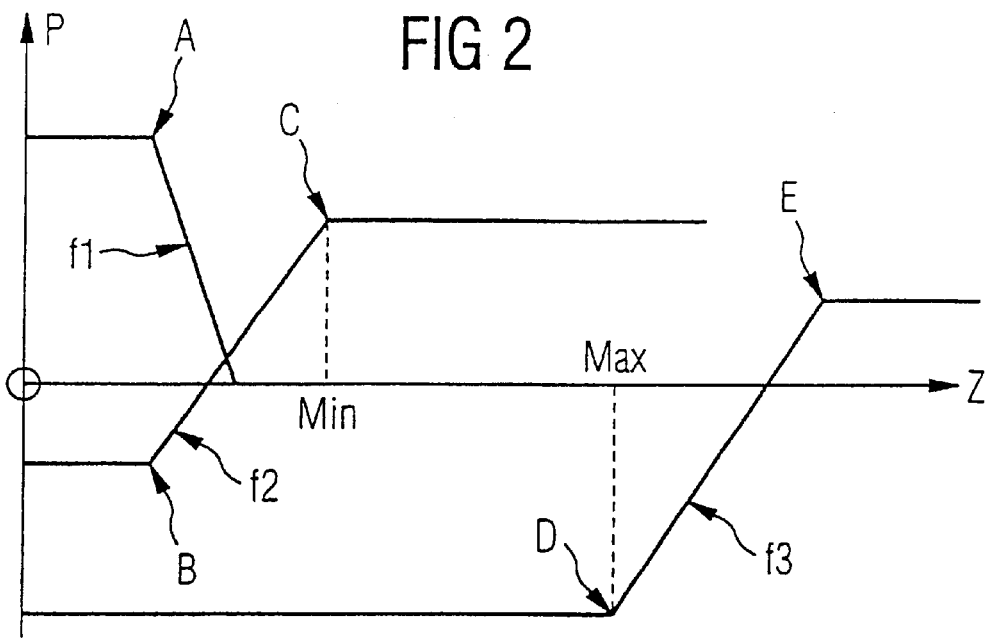
Figure 3:
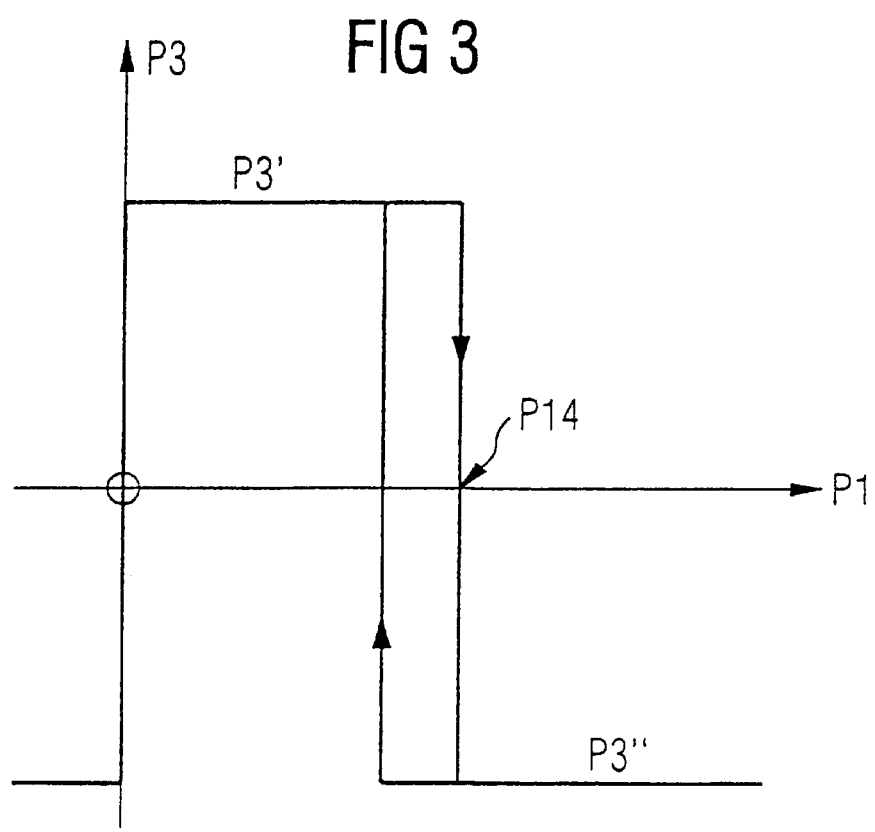

Further advantages and specific details can be found in the following description of an illustrative embodiment. In this context:

FIG. 1 shows a basic illustration of a hybrid system having an associated control system, FIG. 2 shows a basic illustration of a method of calculating charge limit values, and FIG. 3 shows a basic illustration of a method section for calculating the storage power.

In accordance with FIG. 1, a hybrid system comprises an energy store 1 and an energy source 2. In the present case, the energy store 1 is in the form of an electric battery. The energy source 2 is in the form of an internal combustion engine having a generator connected downstream, or is in the form of a fuel cell. The hybrid system is controlled by a control system comprising a computing block 3 and an adder 7. It is used in an urban bus, for example.

To control the hybrid system, a system power P1 which is currently to be output is input into the computing block 3 as input signal by means of a suitable set-point encoder 4—e.g. a gas pedal in a bus. The computing block 3 then ascertains a source power P2 which is to be output by the energy source 2. A storage power P3 which is to be output or absorbed by the energy store 1 is then inevitably established as the difference between the system power P1 and the source power P2.

The source power P2 is ascertained on the basis of at least one optimization criterion. The optimization criterion may be, by way of example, minimization of the primary energy consumption, minimization of the production of harmful substances or minimization of the noise produced by the hybrid system. To design the computing block 3 to be as flexible as possible, the optimization criterion can be prescribed to the computing block 3 via an interface 5, and is thus parameterizable.

To optimize the operation of the hybrid system, an internal process first takes place within the computing block 3 to ascertain what storage power P3 is to be output or absorbed by the energy store 1.

To ascertain the storage power P3, five power characteristics of the energy store 1 are prescribed to a first function block F1 via the interface. They are thus parameterizable. The power characteristics define five points A–E in a state diagram—cf. FIG. 2. Plotted upward in FIG. 2 is power, and toward the right the charge state of the energy store 1.

Point A defines a power request function f1. The power request function f1 is constant to the left of point A, and to the right drops linearly to 0. Points B and C define a state discharge function f2. The state discharge function f2 runs horizontally to the left of point B and to the right of point C and rises linearly between points B and C. Points D and E define a state charge function f3. The state charge function f3 likewise runs horizontally to the left of point D and to the right of point E and rises linearly between points D and E.

The function block F1 is supplied with an actual charge state Z for the energy store 1. The function block F1 then uses this charge state Z to ascertain a state charge limit value P4 and a state discharge limit value P5 from the functions f2 and f3, and to ascertain a source charge power P6 from the function f1.

The Z values of points C and D implicitly define a minimum energy content Min and a maximum energy content Max for the energy store 1. The actual charge state Z of the energy store 1 should preferably always be situated between these two values Min, Max.

The state charge limit value P4, the state discharge limit value P5 and the source charge power P6 are forwarded to a function block F2. In addition, the function block F2 is supplied with the system power P1 as a variable. As parameters, two further charge limit values P7, P8, two further discharge limit values P9, P10, a nominal operating point P11 and a power limit value P12 of the energy source 2 are prescribed to the function block F2 via the interface 5. The values P7 to P12 are thus also parameterizable.

The two further charge limit values P7, P8 comprise an energy store charge limit value P7 and an input charge limit value P8. The energy store charge limit value P7 is determined on the basis of the energy store 1. The input charge limit value P8 can be selected as desired. Similarly, the energy store discharge limit value P9 is determined by the circumstances of the energy store 1. The input discharge limit value P10, on the other hand, can be selected arbitrarily.

The nominal operating point P11 indicates the source power P2 at which the energy source 2 is operated in optimum fashion. The power limit value P12 indicates the maximum power which the energy source 2 can deliver.

The function block F2 first determines a power minimum P13 from the source charge power P6, the nominal operating point P11 and the power limit value P12.

A maximum storage power P3' in the discharge mode is then determined. The maximum storage power P3' in the discharge mode is given as the minimum of the following four powers: the state discharge limit value P5, the energy store discharge limit value P9, the input discharge limit value P10 and the difference between the system power P1 and the power minimum P13. It should be noted that the maximum storage power P3' in the discharge mode may be both positive and negative and depends on the requested system power P1.

A maximum storage power P3" in the charge mode is then determined. The maximum storage power P3" in the charge mode is given as the maximum of the following four powers: the state charge limit value P4, the energy store limit value P7, the input charge limit value P8 and the difference between the system power P1 and the nominal operating point P11.

To operate the energy source 2 in optimum fashion, it should either be completely at rest or should be operated in the vicinity of its nominal operating point P11, for example. The maximum storage powers P3', P3" in the discharge and charge modes are therefore determined such that this is the case. In this context, the maximum storage powers P3', P3" are dependent on the system power P1, as mentioned above.

To ascertain the storage power P3, the maximum storage powers P3', P3" are forwarded from the function block F2 to a function block F3. In addition, the function block F2 transmits a binary control signal s to the function block F3. Finally, the function block F1 prescribes another critical system power P14 to the function block F3. The critical system power P14 is ascertained by the function block F1 from the charge state Z of the energy store 1. If the critical system power P14 is exceeded or undershot, the energy store 1 is changed over from energy absorption to energy output and vice versa.

The functionality of the function block F3 is illustrated in FIG. 3. Plotted toward the right in FIG. 3 is the system power P1, and upward is the storage power P3. It can be seen that the critical system power P14 is subject to hysteresis, which means that constant changeover of the energy storage mode is prevented.

In the power graph shown in FIG. 3, the energy store 1 is changed over from energy output to energy absorption when the critical system power P14 is exceeded. Depending on whether the control signal s has the value 0 or 1, however, it is also possible to change over from energy absorption to energy output when the critical system power P14 is exceeded. The value of the control signal s is parameterizable and depends on the properties of the energy source 2.

The function block F3 thus uses the system power P1 to ascertain the storage power P3, which is supplied as first input signal to an adder 7 via a ramp 6. The second input signal supplied to the adder 7 is the system power P1 which is to be output. The output signal delivered by the adder 7 is then the source power P2. The actual storage power P3 of the hybrid system is inevitably established as the difference between the system power P1 and the source power P2.

The actual charge state Z of the energy store 1 is continuously monitored in the function block F1. If the charge state Z of the energy store 1 remains between the minimum energy content Min and the maximum energy content Max on the basis of the actual load cycle, the critical system power P14 is maintained. If, on the other hand, the minimum energy content Min is undershot or the maximum energy content Max is exceeded, this is an indication that the critical system power P14 has not been optimally selected. In this case, the critical system power P14 is therefore corrected.

The control system can be used universally. It is not limited to a particular combination of energy store 1 and energy source 2. In particular, the energy store 1 need not be a battery. It could likewise be a supercapacitor or a flywheel. In addition, the energy source 2 need not be an internal combustion engine having a generator connected downstream, or a fuel cell. The energy source 2 could also be an overhead line, for example. The power ratio between the energy store 1 and the energy source 2 can fluctuate significantly. In the extreme case, the energy store 1 or the energy source 2 could even be dispensed with.

The control system may also be used in conjunction with more than one energy store 1. In this case, a dedicated computing block 3 is allocated to each energy store 1. The respective storage powers P3 of the latter are supplied to the adder 7. The energy stores 1 and their associated computing blocks 3 can then be mutually influenced by state-dependent stipulation of the respective input charge limit values P8 and of the input discharge limit values P10 of the respective energy sources 2, for example.

What is claimed is:

1. A control system for a hybrid system comprising
at least one energy store (1) and an energy source (2), the control system using a charge state (Z) in the at least one energy store (1), a nominal operating point (P11) of the energy source (2) and a system power (P1) which is currently to be output to ascertain a storage power (P3) which is to be output or received by the at least one energy store (1) and a source power (P2) which is to be output by the energy source (2) on the basis of at least one optimization criterion,
at least one charge limit value (P4, P7, P8) and
at least one discharge limit value (P5, P9, P10) for the at least one energy store (1) and a power limit value (P12) for the energy source (2) being also used at the same time in order to ascertain the storage power (P3) and the source power (P2), and the at least one charge limit value (P4, P7, P8), the at least one discharge limit value (P5, P9, P10), the power limit value (P12) and the nominal operating point (P11) adapted to be parameterized via an interface (5) in the control system.

2. The control system as claimed in claim 1, wherein in that an energy store charge limit value (P7) provided on the basis of the at least one energy store (1) and an input charge limit value (P8) which can be input are prescribed to the control system as charge limit values (P4, P7, P8).

3. The control system as claimed in claim 1 wherein an energy store discharge limit value (P9) provided on the basis of the at least one energy store (1) and an input discharge limit value (P10) which can be input are prescribed to the control system as discharge limit values (P5, P9, P10).

4. The control system as claimed in claim 1, wherein the at least one optimization criterion can be prescribed via the interface (5) in the control system.

5. The control system as claimed in claim 1 wherein the system uses the charge state (Z) of the at least one energy store (1) to ascertain a state charge limit value (P4), a state discharge limit value (P5) and a source charge power (P6) on the basis of power characteristic values (A-E) for the at least one energy store (1), the power characteristic values (A-E) comprise at least one minimum energy content (Min) and a maximum energy content (Max) and the power characteristic values (A-E) can also be prescribed via the interface (5) of the control system.

6. The control system as claimed in claim 5, wherein the system uses the charge state (Z) of the at least one energy store (1) to ascertain a critical system power (P14) at which the at least one energy store (1) is changed over from energy absorption to energy output and vice versa.

7. The control system as claimed in claim 6, wherein the critical system power (P14) is subject to hysteresis.

8. The control system as claimed in claim 6 wherein the system uses the power limit value (P12) and the nominal operating point (P11) to ascertain whether there is a changeover from energy absorption to energy output when the critical system power (P14) is exceeded or undershot.

9. The control system as claimed in claim 6, wherein the critical system power (P14) is corrected if the charge state (Z) of the at least one energy store (1) falls below the minimum energy content (Min) or exceeds the maximum energy content (Max).

10. The control system as claimed in claim 1 wherein the storage power (P3) is supplied to an adder (7) via a ramp (6) as first input signal, the second input signal supplied to said adder being the system power (P1) which is to be output, and the output signal which is output is the source power (P2).

11. The control system as claimed in claim 7, wherein the system uses the power limit value (P12) and the nominal operating point (P11) to ascertain whether there is a changeover from energy absorption to energy output when the critical system power (P14) is exceeded or undershot.

12. The control system as claimed in claim 7, wherein the critical system power (P14) is corrected if the charge state (Z) of the at least one energy store (1) falls below the minimum energy content (Min) or exceeds the maximum energy content (Max).

13. The control system as claimed in claim 8, wherein the critical system power (P14) is corrected if the charge state (Z) of the at least one energy store (1) falls below the minimum energy content (Min) or exceeds the maximum energy content (Max).

14. The control system as claimed in claim 11, wherein the critical system power (P14) is corrected if the charge state (Z) of the at least one energy store (1) falls below the minimum energy content (Min) or exceeds the maximum energy content (Max).

15. The control system as claimed in claim 2, wherein the at least one optimization criterion can also be prescribed via the interface (5) in the control system.

16. The control system as claimed in claim 3, wherein the at least one optimization criterion can also be prescribed via the interface (5) in the control system.

* * * * *